(12) United States Patent
Williams et al.

(10) Patent No.: US 9,562,692 B2
(45) Date of Patent: Feb. 7, 2017

(54) NOZZLE WITH MULTI-TUBE FUEL PASSAGEWAY FOR GAS TURBINE ENGINES

(71) Applicant: Siemens Aktiengesellschaft, München (DE)

(72) Inventors: Steven Williams, Burlington (CA); Timothy A. Fox, Hamilton (CA); Reinhard Schilp, Orlando, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 445 days.

(21) Appl. No.: 14/164,791

(22) Filed: Jan. 27, 2014

(65) Prior Publication Data

US 2015/0047361 A1     Feb. 19, 2015

Related U.S. Application Data

(60) Provisional application No. 61/761,377, filed on Feb. 6, 2013.

(51) Int. Cl.
| | |
|---|---|
| *F23R 3/34* | (2006.01) |
| *F23R 3/36* | (2006.01) |
| *F23R 3/38* | (2006.01) |
| *F23R 3/22* | (2006.01) |
| *F23R 3/28* | (2006.01) |

(Continued)

(52) U.S. Cl.
CPC .............. *F23R 3/343* (2013.01); *F02C 7/266* (2013.01); *F23D 3/22* (2013.01); *F23D 11/38* (2013.01); *F23D 11/42* (2013.01); *F23D 14/22* (2013.01); *F23D 14/24* (2013.01); *F23R 3/36* (2013.01); *F23R 3/38* (2013.01); *F23D 2207/00* (2013.01)

(58) Field of Classification Search
CPC ............... F23R 3/28; F23R 3/38; F23R 3/343; F23D 11/38
See application file for complete search history.

(56) References Cited

U.S. PATENT DOCUMENTS

| | | | |
|---|---|---|---|
| 2,668,592 A | 2/1954 | Piros et al. | |
| 3,548,592 A * | 12/1970 | Hopkins | F23C 7/00 60/39.827 |

(Continued)

FOREIGN PATENT DOCUMENTS

| | | |
|---|---|---|
| EP | 0125572 A1 | 11/1984 |
| EP | 2520858 A1 | 11/2012 |

(Continued)

*Primary Examiner* — Phutthiwat Wongwian
*Assistant Examiner* — William Breazeal

(57) ABSTRACT

A pilot fuel nozzle for a combustor includes an igniter forming a central body extending along a longitudinal center of the nozzle. A nozzle tip includes a plurality of circumferentially spaced fuel passages and a plurality of circumferentially spaced air passages extending to an outer side of the nozzle tip. The central body extends through a center of the nozzle tip for producing a spark to ignite a fuel/air mixture adjacent to the nozzle tip. A plurality of fuel tubes extend along the central body, each of the fuel tubes having an outlet end engaged on the nozzle tip for delivery of fuel from the nozzle tip into a combustion chamber of the combustor An outer sleeve surrounds the fuel tubes and defines an annular space in fluid communication with the air passages of the nozzle tip between the outer sleeve and the central body.

19 Claims, 3 Drawing Sheets

(51) Int. Cl.
  *F23D 14/22*   (2006.01)
  *F23D 14/24*   (2006.01)
  *F02C 7/266*   (2006.01)
  *F23D 11/38*   (2006.01)
  *F23D 11/42*   (2006.01)
  *F23D 3/22*    (2006.01)

(56) References Cited

U.S. PATENT DOCUMENTS

| | | |
|---|---|---|
| 4,023,351 A | 5/1977 | Beyler et al. |
| 4,455,822 A | 6/1984 | Bayle-Laboure et al. |
| 4,600,151 A | 7/1986 | Bradley |
| 5,361,578 A | 11/1994 | Donlan |
| 5,491,972 A | 2/1996 | Bretz et al. |
| 5,531,066 A | 7/1996 | Pfefferle et al. |
| 5,941,698 A * | 8/1999 | Darling .................. F23D 14/24 431/185 |
| 6,247,317 B1 | 6/2001 | Kostka |
| 6,289,677 B1 | 9/2001 | Prociw et al. |
| 6,311,475 B1 | 11/2001 | Ngo-Beelman et al. |
| 6,698,207 B1 | 3/2004 | Wiebe et al. |
| 6,862,888 B2 | 3/2005 | Akagi et al. |
| 7,117,678 B2 | 10/2006 | Sampath et al. |
| 8,393,155 B2 | 3/2013 | Piper et al. |
| 8,490,381 B2 | 7/2013 | Kopecek et al. |
| 2009/0211256 A1 | 8/2009 | Williams |
| 2009/0293482 A1* | 12/2009 | Davis, Jr. ................ F23D 14/82 60/737 |
| 2010/0186417 A1 | 7/2010 | Blomeyer et al. |
| 2011/0126509 A1 | 6/2011 | Headland et al. |
| 2012/0304651 A1 | 12/2012 | Patel et al. |

FOREIGN PATENT DOCUMENTS

| | | |
|---|---|---|
| GB | 2149075 A | 6/1985 |
| GB | 2470282 A | 11/2010 |
| JP | 2009204301 A | 9/2009 |
| WO | 9826216 A1 | 6/1998 |

* cited by examiner

NOZZLE WITH MULTI-TUBE FUEL PASSAGEWAY FOR GAS TURBINE ENGINES

CROSS REFERENCE TO RELATED APPLICATION

This application claims the benefit of U.S. Provisional Patent Application Ser. No. 61/761,377, filed Feb. 6, 2013, entitled "MULTI-TUBE FUEL PASSAGEWAY", the entire disclosure of which is incorporated by reference herein.

FIELD OF THE INVENTION

The present invention relates to gas turbine engines and, more particularly, to a pilot nozzle in a combustor for a gas turbine engine.

BACKGROUND OF THE INVENTION

Pilot nozzles are used in gas turbine engines to ignite a fuel/air mixture. In particular, the pilot nozzle ignites a mixture of liquid fuel and/or gas fuel with air in a combustion zone located downstream from the pilot nozzle. Additional fuel nozzles, including main fuel nozzles, are also provided to combust further portions of a fuel/air mixture. The fuel and the air are typically mixed together in a swirling zone and are ignited in the combustion zone to create a high-energy fluid flow to produce a hot working gas which is conveyed to a turbine section to extract a work output for the gas turbine engine.

Stringent emissions requirements in the US. and abroad have required design improvements to the combustor section of the gas turbine engines, including provision of Ultra-Low NOx (ULN) combustor designs to operate with low NOx emissions, as well as lower CO, VOC and particulate emissions Such ULN designs can include dual fuel ULN pilot nozzles that facilitate control of the combustion process during various operating conditions to minimize emissions

SUMMARY OF THE INVENTION

In accordance with an aspect of the invention, a fuel nozzle is provided for operation in a combustor. The fuel nozzle includes a central body, the central body defining a generally cylindrical shape having an outer diameter. A nozzle tip is located at an end of the central body. A plurality of fuel tubes extend along the outer diameter of the central body, and each of the fuel tubes has an outlet end engaged on the nozzle tip for delivery of fuel from the nozzle tip into a combustion chamber of the combustor.

The plurality of fuel tubes may be spaced equidistant from each other circumferentially around the central body The fuel tubes may be configured in a spiral, extending longitudinally along and circumferentially around the central body Three fuel tubes may be provided, spaced equidistant from each other The nozzle tip may be a disk-shaped structure having an outer side and an inner side, fuel passages may extend from the inner side to the outer side, and each of the fuel tubes may include an outlet end connected to a respective fuel passage An outer sleeve may surround the fuel tubes and form an annular space between the outer sleeve and the central body, a source of air may supply air to the annular space, and air passages may extend through the nozzle tip from an inner end of the air passages at the inner side to the outer side, the inner end of the air passages may be open to the annular space for conveying air to the outer side of the nozzle tip.

A support member may span from the outer sleeve to the central body at a longitudinal location between the source of air and the nozzle tip, the support member engaging the fuel tubes to locate the fuel tubes at a predetermined spacing from each of the outer sleeve and the central body. The support member may be an annular ring member including a plurality of perforations for passage of air from the air source to the nozzle tip.

The central body may be an igniter having a distal end at the nozzle tip for producing a spark to ignite a fuel/air mixture adjacent to the nozzle tip.

The nozzle tip may be a circular member that defines a nozzle tip diameter, and the fuel tubes may be located within an imaginary circle circumscribed around the fuel tubes and defining a diameter that is no greater than the nozzle tip diameter.

A nozzle base may be provided having a fuel plenum receiving fuel from a fuel supply, and an end of each of the fuel tubes opposite from the nozzle tip may be connected in fluid communication to the fuel plenum In accordance with another aspect of the invention, a pilot fuel nozzle is provided for a combustor for a gas turbine engine The nozzle includes an igniter forming a central body extending along a longitudinal center of the nozzle and defining a generally cylindrical shape having an outer diameter. A disk-shaped nozzle tip has a plurality of circumferentially spaced fuel passages extending from an inner side to an outer side of the nozzle tip, and a plurality of circumferentially spaced air passages extending from the inner side to the outer side of the nozzle tip. The central body has a distal end extending through a center of the nozzle tip for producing a spark to ignite a fuel/air mixture adjacent to the nozzle tip. A plurality of fuel tubes extend along the outer diameter of the central body, each of the fuel tubes having an outlet end engaged on the inner side of the nozzle tip for delivery of fuel from the nozzle tip into a combustion chamber of the combustor. An outer sleeve surrounds the fuel tubes and defines an annular space in fluid communication with the air passages of the nozzle tip between the outer sleeve and the central body.

The nozzle tip may be a circular member that defines a nozzle tip diameter, and the fuel tubes may be located within an imaginary circle circumscribed around the fuel tubes and defining a diameter that is no greater than the nozzle tip diameter.

A nozzle base may be provided having a fuel plenum receiving fuel from a fuel supply, and an end of each of the fuel tubes opposite from the nozzle tip may be connected in fluid communication to the fuel plenum The outer sleeve may include an annular diffusion passage and an annular premix passage surrounding the fuel tubes, the diffusion passage and premix passage conveying respective gas flows from the nozzle base toward the nozzle tip The central body may be supported on the nozzle base.

A support member may span from the outer sleeve to the central body at a longitudinal location between the nozzle base and the nozzle tip, the support member engaging the fuel tubes to locate the fuel tubes at a predetermined spacing from each of the outer sleeve and the central body The support member may be an annular ring member including a plurality of perforations for passage of air from a location adjacent to the nozzle base to the nozzle tip A source of air may supply air to the annular space via the nozzle base.

The fuel tubes may be configured in a spiral, extending longitudinally along and circumferentially around the central body.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention In accordance with an aspect of the invention, a pilot nozzle is provided for a combustion system in a gas turbine engine, in which a fuel pathway is provided that ensures a sealed flow path and that is simplified to accommodate thermal movement of components forming the nozzle In particular, an aspect of the invention includes provision of plural fuel tubes to convey fuel directly to outlets formed at the end of the nozzle. Also, the present fuel nozzle can accommodate a fixed igniter, while still providing the fuel and air flows of prior pilot nozzles formed to fit within the same package size. The plural fuel tubes can be combined in an annular space for conveying cooling air, and surrounding the igniter located centrally in the nozzle, to provide a packaging of the nozzle components that can fit within a spacial envelope that is the same size as prior pilot nozzles that utilized a central passage to convey the fuel oil to an outlet end of the nozzle.

Figure 1:
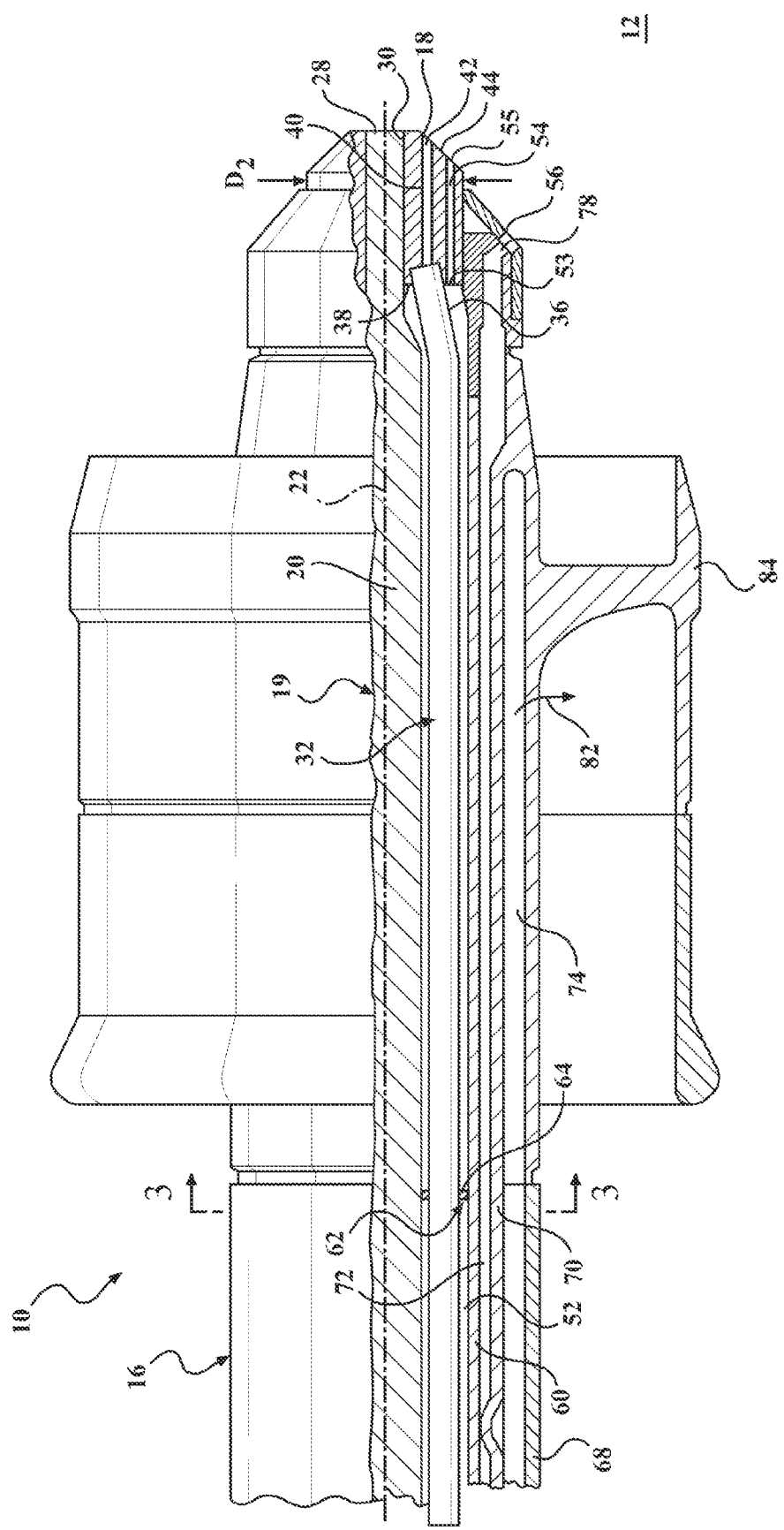
FIG. 1 is a partial cross-sectional view through a pilot nozzle in accordance with aspects of the invention.

FIG. 1 illustrates a pilot nozzle 10 configured in accordance with aspects of the present invention. As may be understood further from the description below, the nozzle 10 can form a part of a ULN combustion system, providing plural fuel flows for facilitating combustion in a combustion chamber of a combustor, generally designated 12

Figure 2:
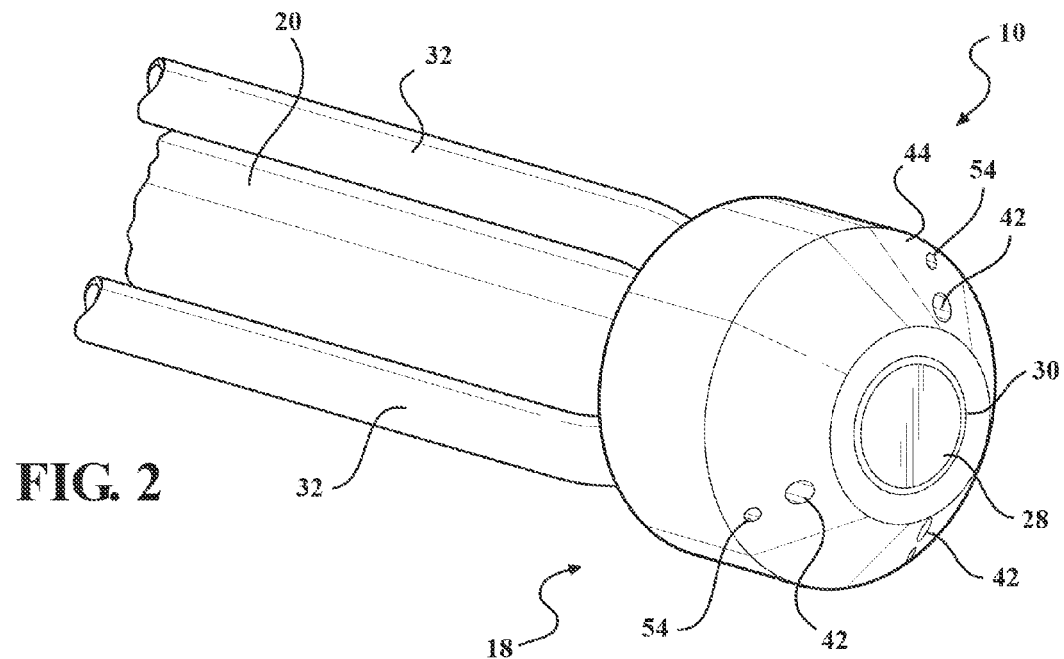
FIG. 2 is a perspective view of a nozzle tip end of the pilot nozzle.
Figure 3:
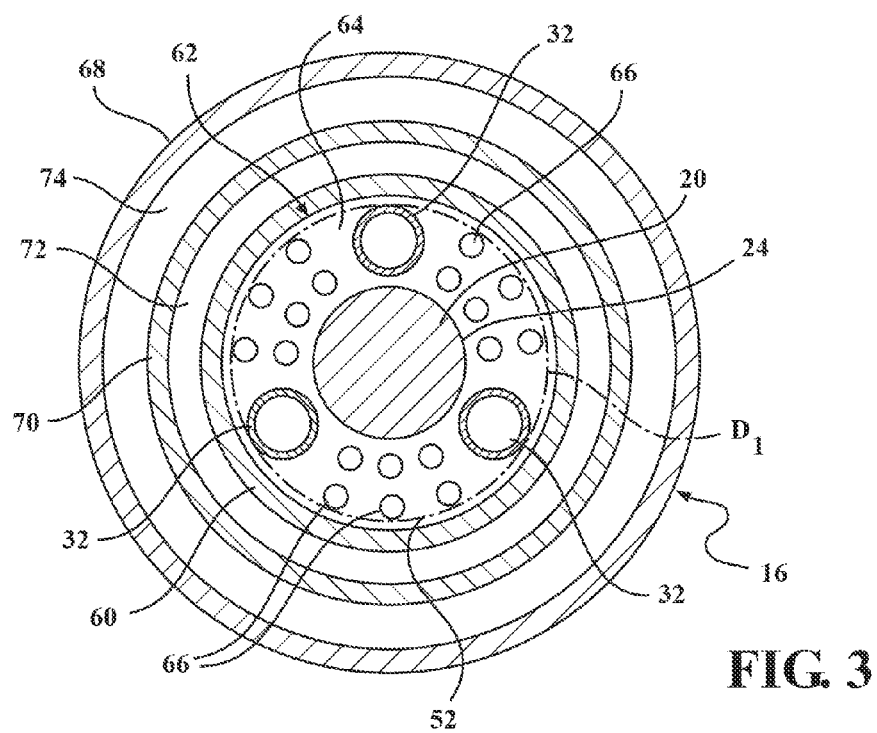
FIG. 3 is a cross-sectional view taken along line 3-3 in FIG. 1.
Figure 4:
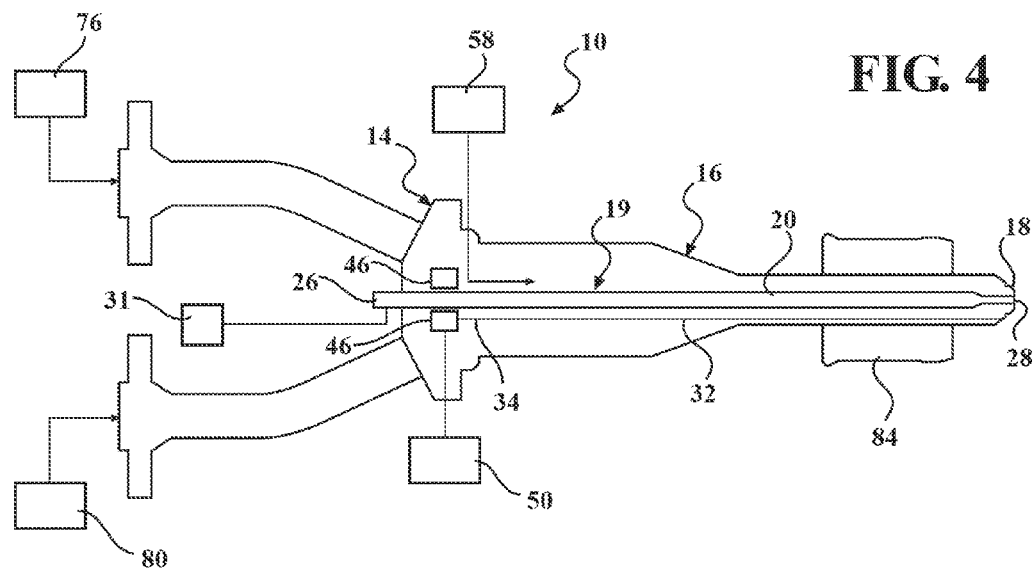
FIG. 4 is a diagrammatic view of a fuel delivery system incorporating the pilot nozzle of FIG. 1.

As seen in FIGS. 1 and 4, the pilot nozzle 10 includes a nozzle base 14, an outer sleeve 16 extending in a longitudinal direction from the nozzle base 14, and a disk-shaped nozzle tip 18 located at an end of the outer sleeve 16 distal from the nozzle base 14. In accordance with an aspect of the invention, an igniter 20 forms a central body 19 extending along a longitudinal center 22 of the nozzle 10. The igniter 20 defines a generally cylindrical shape (FIG. 3) having outer surface 24 defining an outer diameter, and has a proximal end 26 supported to the nozzle base 14 and includes a distal end 28 that extends through a central aperture 30 in the nozzle tip 18. The distal end 28 of the igniter 20 can be formed as a reduced diameter terminal end of the igniter 20 for producing a spark at the aperture 30. The igniter 20 can be energized, such as via a voltage source 31 (FIG. 4) to produce a spark between the igniter 20 and an adjacent portion of the nozzle 10, e. g., the nozzle tip 18, for igniting a fuel/air mixture in the combustion chamber 12 adjacent to the nozzle tip 18. The igniter 20 operates as a fixed structural member to form a radial inner support structure for supporting fuel tubes, as described below Referring to FIGS. 1, 2 and 4, a plurality of fuel tubes 32 extend along the outer diameter defined by the outer surface 24 of the igniter, and are maintained at a predetermined small spacing from the igniter 20, as is described further below. Each of the fuel tubes 32 has an inlet end 34 (FIG. 4) engaged with the nozzle base 14 and an outlet end 36 (FIG. 1) engaged on an inner side 38 of the nozzle tip 18. The nozzle tip 18 includes a fuel passage 40 extending from the inner side 38 to a fuel exit or outlet 42 at an outer side 44 of the nozzle tip 18. The fuel tubes 32 and associated fuel passages 40 are spaced equidistant from each other circumferentially around the igniter 20 (FIG. 3) and around the nozzle tip 18 (FIG. 2), and are provided for conveying fuel oil to deliver the fuel from the nozzle tip 18 into the combustion chamber 12 of the combustor In the preferred embodiment, three fuel tubes 32 and associated fuel passages 40 are provided, although it may be understood that the invention may include a different number of the plural fuel tubes 32 and passages 40. Hence, in the present exemplary embodiment, the fuel tubes 32 and fuel passages 40 may be located 120 degrees apart. In accordance with a further aspect of the invention, the fuel tubes 32 are in fluid communication with and can each receive a metered amount of fuel from a common fuel plenum 46 formed in and extending around the nozzle base 14 The fuel plenum 46 can receive fuel oil from a fuel supply 50, and is configured to provide an equal amount of fuel flow to each of the plural fuel tubes 32, so as to assure that the same fuel flow is emitted from each of the fuel passage outlets 42

The outer sleeve 16 surrounds the fuel tubes 32 and defines an annular space 52 between the outer sleeve 16 and the igniter 32 The annular space 52 is in fluid communication with a plurality of air passages 54 extending from the inner side 38 to the outer side 44 of the nozzle tip 18. The air passages 54 are circumferentially spaced around the nozzle tip 18, and preferably include at least one air passage 54 adjacent to each of the fuel passage outlets 42 Air from the air passages 54 can pass from an inner end 53 to an outer end 55 of the air passages 54 to provide film cooling to outer surface 44 of the nozzle tip 18, in order to reduce the possibility overheating and coking of the outer surface 44. It may be understood that more air passages 54 than are illustrated herein can be provided Further, the air passages 54 can be positioned at various locations on the nozzle tip 18, such as to additionally provide a cooling air flow to a heat shield 56 for the nozzle tip 18.

A source of air 58 is connected to the nozzle base 14 to provide air to the annular space 52. Air supplied from the source of air 58 at the nozzle base 14 can pass longitudinally through the annular space 52 between the fuel tubes 32 to the nozzle tip 18. Hence, the annular space 52 can form a conduit for two fluid flows, i.e., fuel oil and cooling air, provided to the nozzle tip 18 In addition, it may be noted that the cooling air in the annular passage 52 is in contact with the outer surface of the igniter 20, and can provide cooling to the igniter 20 as it passes through the annular passage 52 to the nozzle tip 18.

Referring to FIG. 3, the fuel tubes 32 are supported in radially spaced relation to both the igniter 20 and an inner wall 60 of the outer sleeve 16 The tubes 32 can be maintained in a predetermined radial position by a support member 62. In the illustrated configuration, the support member 62 is formed by annular plate defining an annular ring member 64 that spans from the inner wall 60 of the outer sleeve 16 to the igniter 20 Hence, the igniter 20 and the inner wall 60 from a support structure for supporting the support member 62 The annular ring member 64 includes a plurality of perforations 66 for permitting passage of air through the ring member 64 in the longitudinal direction of the annular space 52. Although the support member 62 is illustrated by only one ring member 64 (FIG. 1), it may be understood that any number of ring members 64 may be provided as necessary to support the tubes 32 Further, although the air passage through the ring member 64 is illustrated by circular perforations 66, the perforations 66 may comprise any configuration of opening that permits adequate air flow volume to the air passages 54, while enabling the ring member 64 to provide sufficient support to the tubes 32

It should be noted that the fuel tubes 32 are located in a compact radial envelope that can be defined by an imaginary circle circumscribed around the fuel tubes 32 and having a diameter $D_1$ (FIG. 3) that is no greater than an outer diameter $D_2$ (FIG. 1) of the nozzle tip 18. In accordance with an aspect of the invention, the plural fuel tubes 32 located in the limited area, as described for diameters $D_1$ and $D_2$, facilitates formation of the pilot nozzle 10 as a compact package capable of being positioned within an area corresponding to the area allotted for prior ULN pilot nozzle designs.

Referring to FIGS. 1 and 3, the outer sleeve 16 defines additional passages surrounding the annular passage 52 for conducting gas flows from the nozzle base 14 to downstream locations of the outer sleeve 16. In particular, the outer sleeve 16 additionally includes an outer wall 68 defining an outer surface of the outer sleeve 16, and an intermediate wall 70 located in radially spaced relation to the inner and outer walls 60, 68 An annular diffusion passage 72 is defined between the inner wall 60 and the intermediate wall 70, and an annular premix passage 74 is defined between the outer wall 68 and the intermediate wall 70 The diffusion passage 72 can convey an amount of diffusion fuel from a diffusion fuel source 76 (FIG. 4) to diffusion outlets 78 adjacent to the nozzle tip 18, and the premix passage 74 can convey an amount of premix fuel from a premix fuel source 80 (FIG. 4) to outlets, depicted by arrow 82, located at an upstream location relative to the diffusion outlets 78, such as an upstream location of a swirler 82. It may be understood that the provision of the diffusion fuel and the premix fuel can facilitate reduction of emissions, as is known for ULN nozzles.

The outer sleeve 16 extends through the swirler 84, and the outer wall 68 is generally contiguous with an inner diameter of the swirler 84 Hence, in order to fit within existing combustor configurations, the pilot nozzle 10 of the present invention is formed with an outer diameter, as defined by the outer wall 68, that matches the inner diameter of existing swirlers 84 in the combustion system. In addition to fitting the pilot nozzle 10 within the existing swirler 84, and in accordance with an aspect of the invention, the pilot nozzle 10 can provide the same flows for fuel oil, cooling air, diffusion and premix flows as required for prior ULN nozzles, while additionally providing the igniter 20 affixed in the center of the nozzle 10

Figure 5:
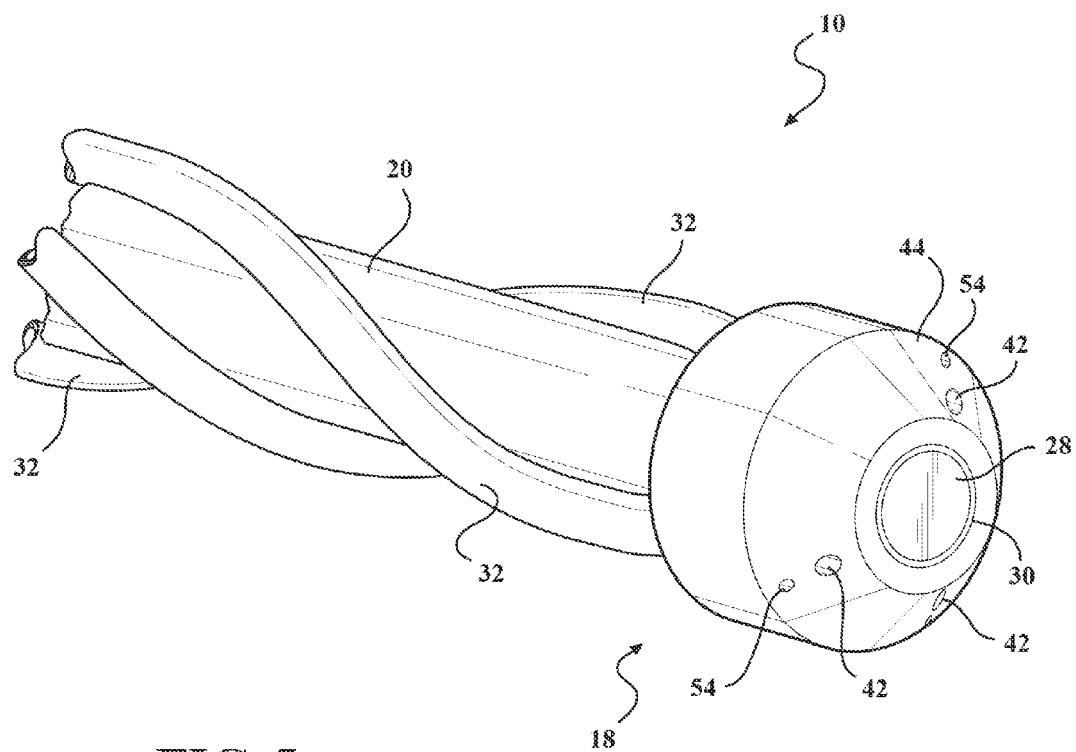
FIG. 5 is a perspective view of the pilot nozzle having fuel tubes arranged in an alternative spiral configuration.

Referring to FIG. 5, an alternative configuration for the pilot nozzle 10 is illustrated in which the fuel tubes 32 are configured in a spiral, extending longitudinally along and circumferentially around the central body 19, and can form a helical path for the cooling air passing through the annular passage 52. It is believed that angling the fuel tubes 32 relative to the longitudinal center 22 of the nozzle 10 can facilitate flexing of the tubes 32 in response to thermal movement of components in the nozzle 10 That is, the tubes 32 can bend to relieve thermal stress in the event of thermal movement of the nozzle components in the direction parallel to the longitudinal center 22 and/or the tubes 32 can bend, i.e., move transverse to the longitudinal center 22, in response to thermal movement, e.g., thermal expansion, of the material forming the tubes 32

It should be noted that, although the present pilot nozzle 10 has been described with specific reference to the preferred embodiment, including an igniter 20 forming the central body 19, the central body 19 could comprise other elongated structures extending along the longitudinal center 22 of the pilot nozzle 10. For example, the central body 19 could alternatively comprise an additional passage for conveying a further fluid or gas to the nozzle tip 18

Additionally, it may be noted that although the fuel tubes 32 are disclosed in the preferred embodiment as conveying fuel oil, other fluids could be conveyed through the fuel tubes 32. For example, and without limitation, the fuel tubes 32 could be used to convey natural gas to the nozzle tip 18 for a diffusion natural gas stage, in which case the diffusion passage 72 may be used to convey another fluid if desired While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fuel nozzle for operation in a combustor, the fuel nozzle including:
   a central body, the central body defining a generally cylindrical shape having an outer diameter;
   a nozzle tip located at an end of the central body;
   fuel tubes extending along the outer diameter of the central body, each of the fuel tubes having an outlet end engaged on the nozzle tip for delivery of fuel from the nozzle tip into a combustion chamber of the combustor;
   an outer sleeve surrounding the fuel tubes and forming an annular space between the outer sleeve and the central body,
   wherein the fuel tubes extend longitudinally in the annular space to form respective flows of fuel in the annular space,
   the annular space fluidly coupled to receive air that forms a flow of air in the annular space, wherein the annular space forms a common conduit space for the respective flows of fuel and the flow of air,
   wherein the fuel tubes are configured in a spiral, extending longitudinally along and circumferentially around the central body, and
   wherein the central body is an igniter having a distal end at the nozzle tip for producing a spark to ignite a fuel/air mixture adjacent to the nozzle tip.

2. The fuel nozzle of claim 1, wherein the fuel tubes are spaced equidistant from each other circumferentially around the central body.

3. The fuel nozzle of claim 2, wherein three fuel tubes are spaced equidistant from each other.

4. The fuel nozzle of claim 1, wherein the nozzle tip is a disk-shaped structure having an outer side and an inner side, fuel passages extend from the inner side to the outer side, and each of the fuel tubes includes an outlet end connected to a respective fuel passage.

5. The fuel nozzle of claim 4, further including:
a source of air supplying the air to the annular space; and
air passages extending through the nozzle tip from an inner end of the air passages at the inner side to the outer side, the inner end of the air passages being open to the annular space for conveying air to the outer side of the nozzle tip.

6. The fuel nozzle of claim 5, including a support member spanning from the outer sleeve to the central body at a longitudinal location between the source of air and the nozzle tip, the support member engaging the fuel tubes to locate the fuel tubes at a predetermined spacing from each of the outer sleeve and the central body.

7. The fuel nozzle of claim 6, wherein the support member is an annular ring member including a plurality of perforations for passage of air from the air source to the nozzle tip.

8. The fuel nozzle of claim 1, wherein the nozzle tip is a circular member that defines a nozzle tip diameter, and the fuel tubes are located within an imaginary circle circumscribed around the fuel tubes and defining a diameter that is no greater than the nozzle tip diameter.

9. The fuel nozzle of claim 1, including a nozzle base having a fuel plenum receiving fuel from a fuel supply, and an end of each of the fuel tubes opposite from the nozzle tip is connected in fluid communication to the fuel plenum.

10. A pilot fuel nozzle for a combustor for a gas turbine engine, the pilot fuel nozzle including:
an igniter forming a central body extending along a longitudinal center of the pilot fuel nozzle and defining a generally cylindrical shape having an outer diameter;
a disk-shaped pilot fuel nozzle tip having circumferentially spaced fuel passages extending from an inner side to an outer side of the disk-shaped pilot fuel nozzle tip, and air passages which are circumferentially spaced, the air passages extending from the inner side to the outer side of the disk-shaped pilot fuel nozzle tip;
the central body having a distal end extending through a center of the disk-shaped pilot fuel nozzle tip for producing a spark to ignite a fuel/air mixture adjacent to the disk-shaped pilot fuel nozzle tip;
fuel tubes extending along the outer diameter of the central body, each of the fuel tubes having an outlet end engaged on the inner side of the disk-shaped pilot fuel nozzle tip for delivery of fuel from the disk-shaped pilot fuel nozzle tip into a combustion chamber of the combustor; and
an outer sleeve surrounding the fuel tubes and defining an annular space in fluid communication with the air passages of the disk-shaped pilot fuel nozzle tip between the outer sleeve and the central body,
wherein the fuel tubes extend longitudinally in the annular space to form respective flows of fuel in the annular space,
the annular space fluidly coupled to receive air that forms a flow of air in the annular space, wherein the annular space forms a common conduit space for the respective flows of fuel and the flow of air.

11. The pilot fuel nozzle of claim 10, wherein the disk-shaped pilot fuel nozzle tip is a circular member that defines a pilot fuel nozzle tip diameter, and the fuel tubes are located within an imaginary circle circumscribed around the fuel tubes and defining a diameter that is no greater than the nozzle tip diameter.

12. The pilot fuel nozzle of claim 10, including a pilot fuel nozzle base having a fuel plenum receiving fuel from a fuel supply, and an end of each of the fuel tubes opposite from the disk-shaped pilot fuel nozzle tip is connected in fluid communication to the fuel plenum.

13. The pilot fuel nozzle of claim 12, wherein the outer sleeve includes an annular diffusion passage and an annular premix passage surrounding the fuel tubes, the diffusion passage and premix passage conveying respective gas flows from the pilot fuel nozzle base toward the disk-shaped pilot fuel nozzle tip.

14. The pilot fuel nozzle of claim 12, wherein the central body is supported on the pilot fuel nozzle base.

15. The pilot fuel nozzle of claim 12, including a support member spanning from the outer sleeve to the central body at a longitudinal location between the pilot fuel nozzle base and the disk-shaped pilot fuel nozzle tip, the support member engaging the fuel tubes to locate the fuel tubes at a predetermined spacing from each of the outer sleeve and the central body.

16. The pilot fuel nozzle of claim 15, wherein the support member is an annular ring member including a plurality of perforations for passage of air from a location adjacent to the pilot fuel nozzle base to the nozzle tip.

17. The pilot fuel nozzle of claim 16, including a source of air supplying the air to the annular space via the pilot fuel nozzle base.

18. The pilot fuel nozzle of claim 10, wherein the fuel tubes are configured in a spiral, extending longitudinally along and circumferentially around the central body.

19. A fuel nozzle for operation in a combustor, the fuel nozzle including:
a central body, the central body defining a generally cylindrical shape having an outer diameter;
a nozzle tip located at an end of the central body;
fuel tubes extending along the outer diameter of the central body, each of the fuel tubes having an outlet end engaged on the nozzle tip for delivery of fuel from the nozzle tip into a combustion chamber of the combustor;
an outer sleeve surrounding the fuel tubes and forming an annular space between the outer sleeve and the central body,
wherein the fuel tubes extend longitudinally in the annular space to form respective flows of fuel in the annular space,
the annular space fluidly coupled to receive air that forms a flow of air in the annular space, wherein the annular space forms a common conduit space for the respective flows of fuel and the flow of air,
wherein the nozzle tip is a disk-shaped structure having an outer side and an inner side, fuel passages extend from the inner side to the outer side, and each of the fuel tubes includes an outlet end connected to a respective fuel passage, and
wherein the central body is an igniter having a distal end at the nozzle tip for producing a spark to ignite a fuel/air mixture adjacent to the nozzle tip.

* * * * *